United States Patent
Akimoto et al.

(10) Patent No.: US 8,159,105 B2
(45) Date of Patent: Apr. 17, 2012

(54) SEGMENT-CORE TYPE STATOR FOR INNER-ROTOR TYPE ROTARY ELECTRIC MACHINES AND AN IMPROVED METHOD FOR MANUFACTURING THE STATOR

(75) Inventors: Akito Akimoto, Kariya (JP); Toshiaki Oohara, Okazaki (JP); Masayuki Takiguchi, Nagoya (JP); Masaomi Dobashi, Kariya (JP)

(73) Assignee: Denso Corporation, Kariya (JP)

( * ) Notice: Subject to any disclaimer, the term of this patent is extended or adjusted under 35 U.S.C. 154(b) by 569 days.

(21) Appl. No.: 12/427,157

(22) Filed: Apr. 21, 2009

(65) Prior Publication Data
US 2009/0261685 A1  Oct. 22, 2009

(30) Foreign Application Priority Data
Apr. 21, 2008  (JP) ................................. 2008-110784

(51) Int. Cl.
*H02K 3/04* (2006.01)
*H02K 1/06* (2006.01)
*H02K 15/00* (2006.01)

(52) U.S. Cl. ................. 310/207; 310/208; 310/216.003; 310/216.005; 310/216.008; 29/596

(58) Field of Classification Search .................. 310/188, 310/193, 207–208, 216.001–216.005, 216.007–216.008; 29/596
See application file for complete search history.

(56) References Cited

U.S. PATENT DOCUMENTS

| 6,951,054 B2 | 4/2005 | Hirota et al. |
| 2002/0047449 A1 | 4/2002 | Kim et al. |
| 2004/0021391 A1* | 2/2004 | Jones et al. ................... 310/208 |
| 2004/0040142 A1 | 3/2004 | Hirota et al. |
| 2006/0005376 A1 | 1/2006 | Hirota et al. |
| 2007/0200440 A1* | 8/2007 | Kalsi et al. ...................... 310/54 |

FOREIGN PATENT DOCUMENTS

| JP | 11-289696 | 10/1999 |
| JP | 2002-044893 | 2/2002 |
| JP | 2002-141230 | 5/2002 |
| JP | 2002-315251 | 10/2002 |
| JP | 2003-235187 | 8/2003 |
| JP | 2004-104841 | 4/2004 |
| JP | 3894004 | 12/2006 |
| JP | 2007-274749 | 10/2007 |

OTHER PUBLICATIONS

Japanese Office Action dated Jan. 12, 2010, issued in corresponding Japanese Application No. 2008-110784, with English translation.

* cited by examiner

*Primary Examiner* — Quyen Leung
*Assistant Examiner* — Jose Gonzalez Quinones
(74) *Attorney, Agent, or Firm* — Nixon & Vanderhye PC

(57) ABSTRACT

When accommodating a cage stator coil in a stator core made up of distributed cores, an end side distributed core composing end side core at an end side in axial direction is made larger than a central side distributed core composing central side core. The cage stator coil is formed by compressing a central portion of an original cage stator coil. The end side segment core composing the end core is set at a central portion in an axial direction of the cage stator coil then the end side coil is moved to an end portion in the axial direction. The central side segment core composing the central core is set at the central portion in the axial direction of the cage stator coil thereafter.

5 Claims, 8 Drawing Sheets

SEGMENT-CORE TYPE STATOR FOR INNER-ROTOR TYPE ROTARY ELECTRIC MACHINES AND AN IMPROVED METHOD FOR MANUFACTURING THE STATOR

CROSS-REFERENCE TO RELATED APPLICATION

This application is based on and claims the benefit of priority from earlier Japanese Patent Application No. 2008-110784 filed Apr. 21, 2008, the description of which is incorporated herein by reference.

BACKGROUND OF THE INVENTION

[1. Technical Field of the Invention]

The present invention relates to a segment-core type stator for radially-gapped inner-rotor type rotary electric machines and a method for manufacturing the stator.

[2. Related Art]

Recently, it is essential for the automotive industry to give serious consideration to the environment and power saving. Under such circumstances, EVs (electric vehicles) and HVs (hybrid vehicles) have been researched and put to practical use.

In vehicles, such as EVs and HVs, it is important to reduce vehicle weight that has strong positive correlation with fuel consumption. In this regard, there has been a strong demand for enhancing output per unit weight (kW/kgw) of a high-current motor (e.g., drive motor) loaded on such a heavy vehicle. It has been known that, in a stator incorporated in such a motor, the increase in a space factor of slots, i.e. the cross-sectional area of the coil conductor per unit cross-sectional area of slots, in the stator, has a strong positive correlation with the output per unit weight of the motor (kW/kgw).

One known method for winding a coil about a stator involves use of a coil winder. In the case of a conventional winding method, i.e. in the case of winding a fine round wire about one slat, using such a coil winder, it is necessary to ensure a space in the slot, to which the coil winder is inserted. In addition, the cross section of the coil conductor has a circular shape. For these reasons, the space factor of slots (hereinafter referred to "slot space factor") of a stator about which a coil is wound has been as small as about 40%.

It should be appreciated that, throughout the specification, when a term "cross section" or "cross-sectional area" is used for a winding or a wire, the term refers to a cross section or a cross-sectional area perpendicular to the longitudinal direction.

If a flat wire having a large cross-sectional area can be used as a stator coil, the slot space factor may be remarkably improved. However, such a large-size flat wire cannot be wound about a stator with the use of a coil winder, unlike the case of winding a normal fine round wire. On the contrary, bending, per se, has been difficult in winding such a large-size flat wire. Therefore, when a stator is manufactured using a large-size flat conductor wire, the method may preferably include a step of bending the large-size flat conductor wire for preparation of a stator coil in advance, followed by a step of inserting portions of the conductor wire of the coil to be accommodated in slots (herein after referred to as "slot-accommodated portions") into the respective slots of the stator core, for completion of a stator.

Stator coils are known to have concentrated winding or distributed winding. Comparing with the latter, the former is known to have an advantage, for example, of reducing torque ripple. A stator coil having a distributed winding of a large-size flat conductor wire will have the cage shape (hereinafter referred to as a "cage stator coil" or a "cage coil"). The outer diameter of such a cage stator coil will be approximately equal to that of the bottom surface of the slots of the stator core. For this reason, the stator coil cannot be easily inserted into a cylindrical stator core. Specifically, a cage stator coil prepared using a large-size flat square conductor wire of large cross-sectional area will have a very large rigidity. Therefore, it will be very difficult to position the slot-accommodated portions, as they are, radially inside the stator core having a relatively small inner diameter.

An approach known for avoiding the difficulty mentioned above in mounting a cage stator coil in the slots of a stator core, may be to use a segment core structure. Specifically, in this approach, a stator is divided into a plurality of segment cores. Then, the slot-accommodated portions of the cage stator coil are inserted into the slots of each segment core. After that, the segment cores are mechanically connected to complete a stator. Owing to the combination of such a segment-core type stator with a cage stator coil, an insulation-coated flat conductor wire having a large cross-sectional area can be used as a coil conductor to realize a radially-gaped inner-rotor type rotary electric machine having a good slot space factor.

Examples of such a segment-core type stator are disclosed, for example, in Japanese Patent Application Laid-Open Nos. 2002-141230 and 2003-235187.

In the segment-core type stator as mentioned above, the larger number of divisions of the stator core may more facilitate the assemblage of the stator core with the cage stator coil. However, the larger the number of divisions is, the smaller each of the segment cores may become. This, in turn, may complicate the process of mechanically connecting a number of segment cores, each having slots into which the slot-accommodated portions have been inserted.

Stator cores, meanwhile, are required to be ensured with good mechanical rigidity against magnetic vibration and external forces. However, the large number of segment cores with a large number of mechanical connecting portions may unavoidably deteriorate the mechanical rigidity of the stator core. In addition, the large number of segment cores may necessitate the increase of the magnetic resistance of the stator core, leading to deterioration in the output and the torque.

On the other hand, a segment-core type stator having a less number of divisions, such as two, may make it difficult for a cage stator coil with a relatively large diameter, to be inserted into the slots in the segment cores.

SUMMARY OF THE INVENTION

The present invention has been made in light of the above problems, and has as its object to provide a segment-core type stator for inner-rotor type rotary electric machines, in which stator, the increase in the number of divisions of the stator core is suppressed, while complication and difficulties are also suppressed in assembling a cage stator coil into the stator core, and to provide a method for manufacturing the stator.

In order to achieve the aforementioned object, a segment-core type stator for inner-rotor type rotary electric machines having a cage stator coil made up of distributed winding coils, in the cage stator coil a plurality of slot accommodated portions to be accommodated in slots of the stator are disposed at positions a predetermined distance away from a center of an axis in a circumferential direction with a predetermined pitch and a cylindrical stator core composed of a plurality of segment cores wherein the slot accommodated portions of the cage stator coil are accommodated in the slots, wherein a central side segment core composing a cylindrical central core which forms a part of a central portion in an axial direction of the stator core has a larger occupying angle than an end side segment core composing a cylindrical end core which forms a part of an end portion in the axial direction of the stator core.

In particular, the stator core of the invention at least has the end cores disposed near the axial end portions and the center core disposed near the axial center portion. Further, each of the plurality of segment cores for configuring the center core is formed in a circumferentially large scale than each of the plurality of segment cores for configuring each of the end cores. In other words, the number of divisions of the cylindrical core, for the center core, is less than that of each of the end cores.

With this configuration, the difficulty in fitting the segment cores to the stator coil can be eliminated, while the number of divisions of the stator core can be reduced. Therefore, the rigidity of the stator can be enhanced, and the durability can also be enhanced against magnetic noise and external impacts. In addition, this configuration can contribute to simplification of the processes for manufacturing the stator. Further, since the magnetic resistance of the stator core can be reduced, the efficiency, in turn, can be enhanced, leading to the increase of the output and the torque.

In a preferred mode of the present invention, an edge in the circumferential direction of the central side segment core composing the central core and an edge in the circumferential direction of the end side segment core composing the end core are disposed in different positions in the circumferential direction to each other.

Thus, magnetic resistance can be further reduced, and thus, local increase of the magnetic resistance can be reduced. Accordingly, magnetic vibration and magnetic noise can also be reduced.

In a preferred mode of the present invention, an edge in the circumferential direction of the end side segment core composing a first end core and an edge in the circumferential direction of the end side segment core composing a second end core are disposed in different positions in the circumferential direction each other.

Thus, magnetic resistance can be further reduced, and thus, local increase of the magnetic resistance can be reduced. Accordingly, magnetic vibration and magnetic noise can also be reduced.

In order to achieve the object, as another aspect, a method for manufacturing a segment-core type stator for inner-rotor type rotary electric machine having a cage stator coil made up of distributed winding coils is disclosed. In this method, in the cage stator coil a plurality of slot accommodated portions to be accommodated in slots of the stator are disposed at positions a predetermined distance away from a center of an axis in a circumferential direction with a predetermined pitch and a cylindrical stator core composed of a plurality of segment cores wherein the slot accommodated portions of the cage stator coil are accommodated in the slots, wherein the method comprises steps of preparing a cage stator coil made up of distributed winding coils, in the cage stator coil, a plurality of slot accommodated portions to be accommodated in slots of the stator are disposed at positions predetermined distance away from a center of an axis in a circumferential direction with a predetermined pitch, forming a cage stator coil by compressing a central portion of an original cage stator coil, setting an end side segment core composing an end core at a central portion in an axial direction of the cage stator coil then moving the end side coil to an end portion in the axial direction, an d setting an central side segment core composing an central core at the central portion in the axial direction of the cage stator coil thereafter.

This may facilitate the insertion of the stator coil into the slots of the end cores each having less number of divisions.

In a preferred mode of the present invention, the method for manufacturing the segment-core type stator for inner-rotor type rotary electric machines further comprises a step of accommodating a compressed portion of the cage stator coil in the slot by expanding the compressed portion of the cage stator coil to outwards of a diameter direction after the central side segment core has been set at the central portion in the axial direction of the cage stator coil.

In a preferred mode of the present invention, the method for manufacturing the segment-core type stator for inner-rotor type rotary electric machines further comprises a step of accommodating a compressed portion of the cage stator coil in the slot by expanding the compressed portion of the cage stator coil to outwards of a diameter direction before the central side segment core is set at the central portion in the axial direction of the cage stator coil.

DETAILED DESCRIPTION OF THE PREFERRED EMBODIMENTS

With reference to the drawings, hereinafter will be specifically described some preferred embodiments of the present invention.

The preferred embodiments deal with a structure of a stator for a rotary electric machine, which stator is configured by fitting a cage stator coil of distributed winding into segment cores (hereinafter may also be referred to as "divided cores"), and a method for manufacturing the stator. It should be appreciated that the embodiments provided below are just intended to exemplify preferred modes of the present invention and that, as a matter of course, the technical concept of the present invention may be implemented, being combined with other known techniques.

(First Embodiment)

Figure 1:
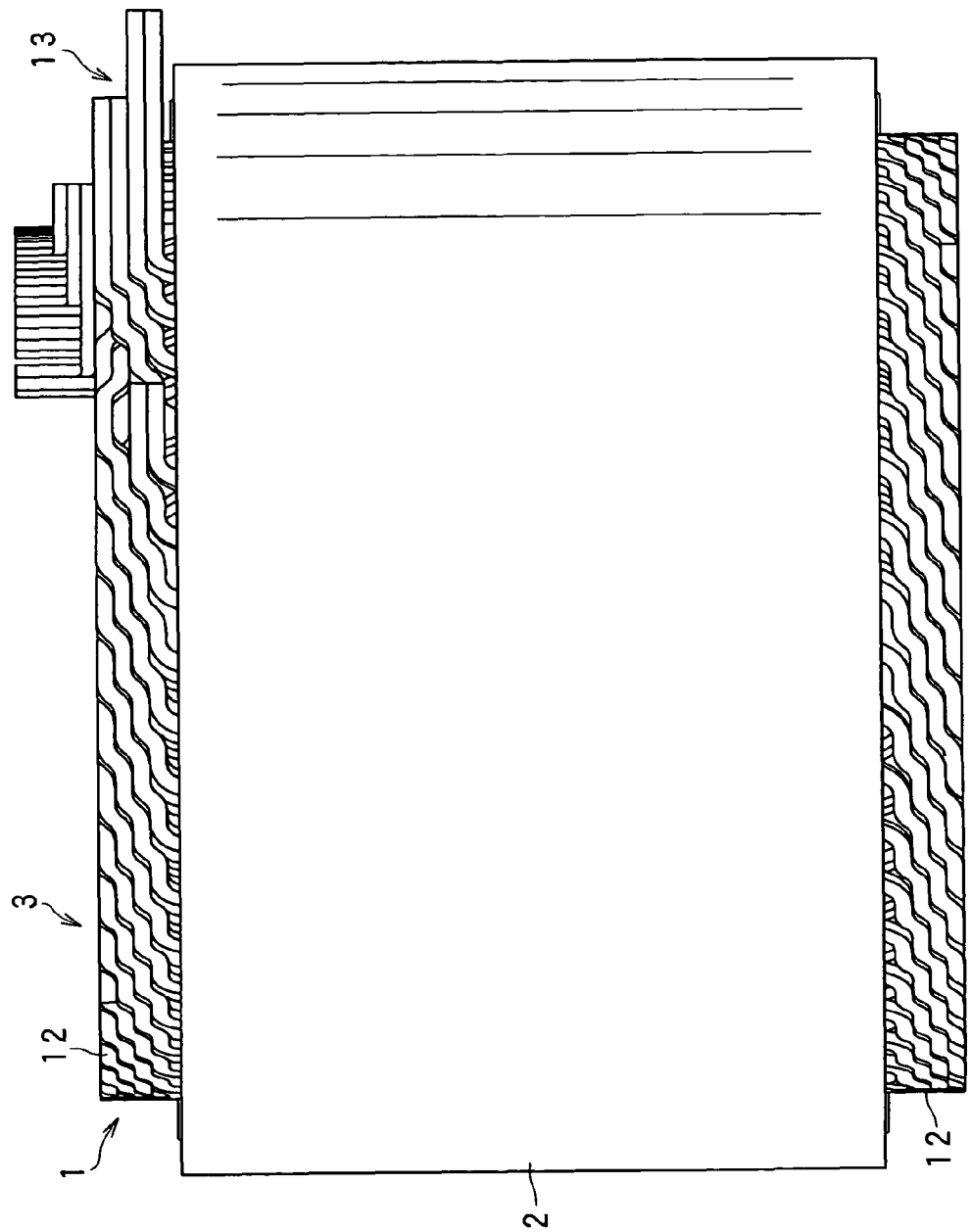
FIG. 1 is a side view illustrating an example of a stator structure used for an embodiment of the present invention.

Referring to a side view shown in FIG. 1, an example of a stator structure is described.

FIG. 1 shows a stator 3 for a radially-gaped inner-rotor type rotary electric machine. The stator 3 includes a stator coil 1, a stator core 2 into which the stator coil 1 is fitted.

The stator coil 1 is configured by star-connecting three-phase windings, each of which is obtained by winding in a distributed manner a large-size flat conductor wire having a large cross-sectional area. Thus, the stator coil 1, as a whole, has the shape of a cage.

The stator coil 1 includes a number of slot-accommodated portions 11 which are conductive parts to be inserted into respective slots of the stator core 2. The stator coil 1 also includes coil end portions 12 which are conductive parts projected axially outward from both ends of the respective slot-accommodated portions, or in other words, projected from both end faces of the stator core 2. In FIG. 1, the slot-accommodated portions are hidden by the stator core 2. Each of the coil end portions 12 is formed by bending a conductor wire (a large-size flat conductor wire) into a shape of a staircase to provide steps in the substantially axial and circumferential directions. With this bending, the length of the axial projection of the coil end portions 12 is reduced. In the figure, a reference numeral 13 indicates output terminals and neutral points.

Figure 2:
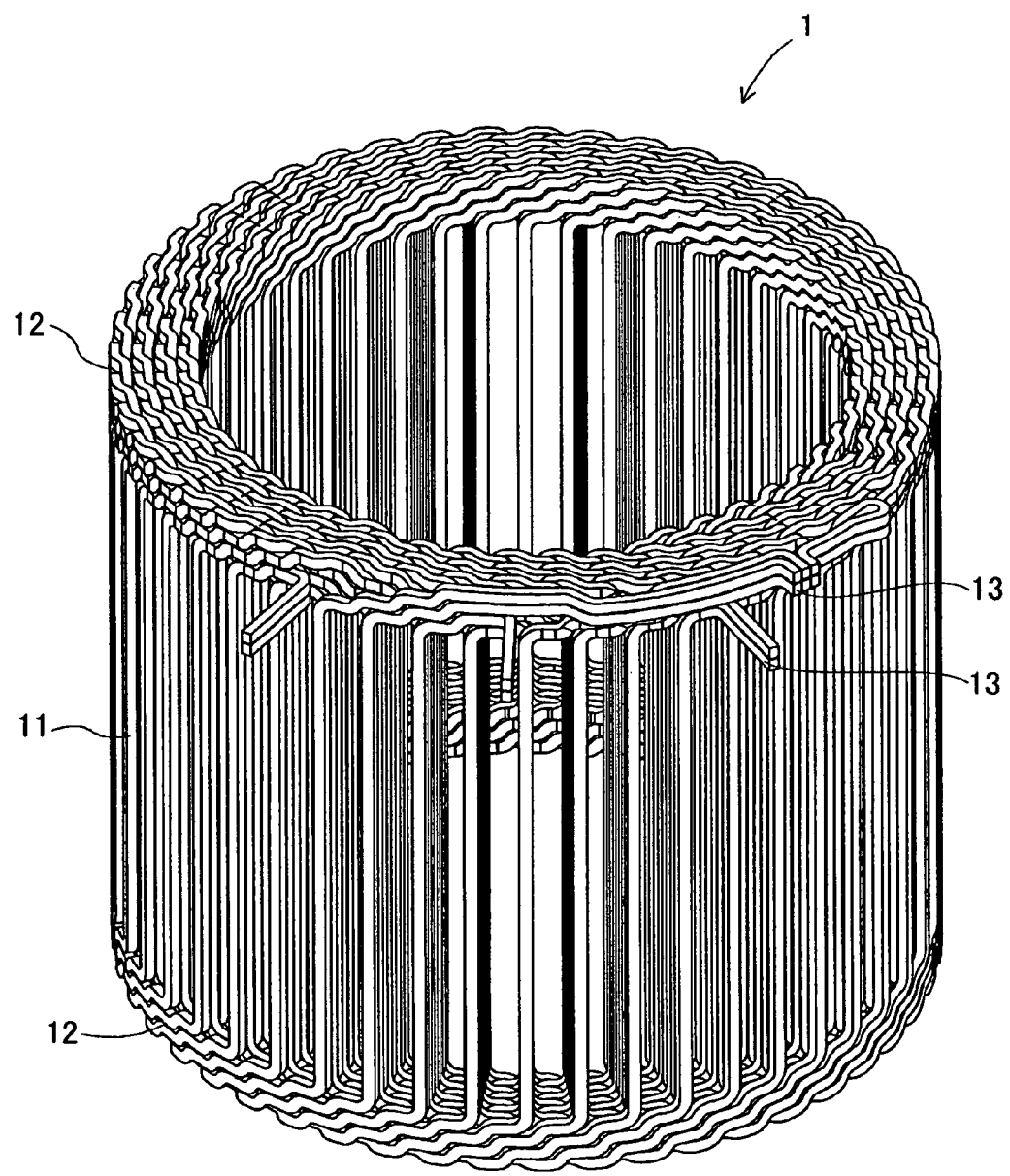
FIG. 2 is a perspective view illustrating the shape of the stator coil of the stator illustrated in FIG. 1.

Referring to FIG. 2, the cage stator coil 1 is explained. FIG. 2 is a perspective view illustrating the stator coil 1. The stator coil 1 consists of the slot-accommodated portions 11 that axially pass through the slots of the stator core 2, and coil ends each of which corresponds to a group of the coil end portions 12. In each of the coil ends, each coil end portion 12 connects two slot-accommodated portions 11, 11 distanced from each other by an electrical angle of "π". In the present embodiment, the cage stator coil 1 is configured, being imparted with wave winding. The wave-winding structure, per se, of the stator coil 1 will be briefly explained, although it is well known today.

Each slot accommodates a total of eight slot-accommodated portions 11, concurrently forming eight overlaps in the radial direction and one step in the circumferential direction. A group of two radial overlaps of the slot-accommodated portions 11 configure one turn of a three-phase wave-winding partial coil. Accordingly, the stator coil 1 is configured by serially connecting a total of four turns of three-phase wave-winding partial coils. Two slots are arranged for every pole and every phase. In other words, the stator core 2 has twelve slots per electrical angle of "2π".

Figure 3:
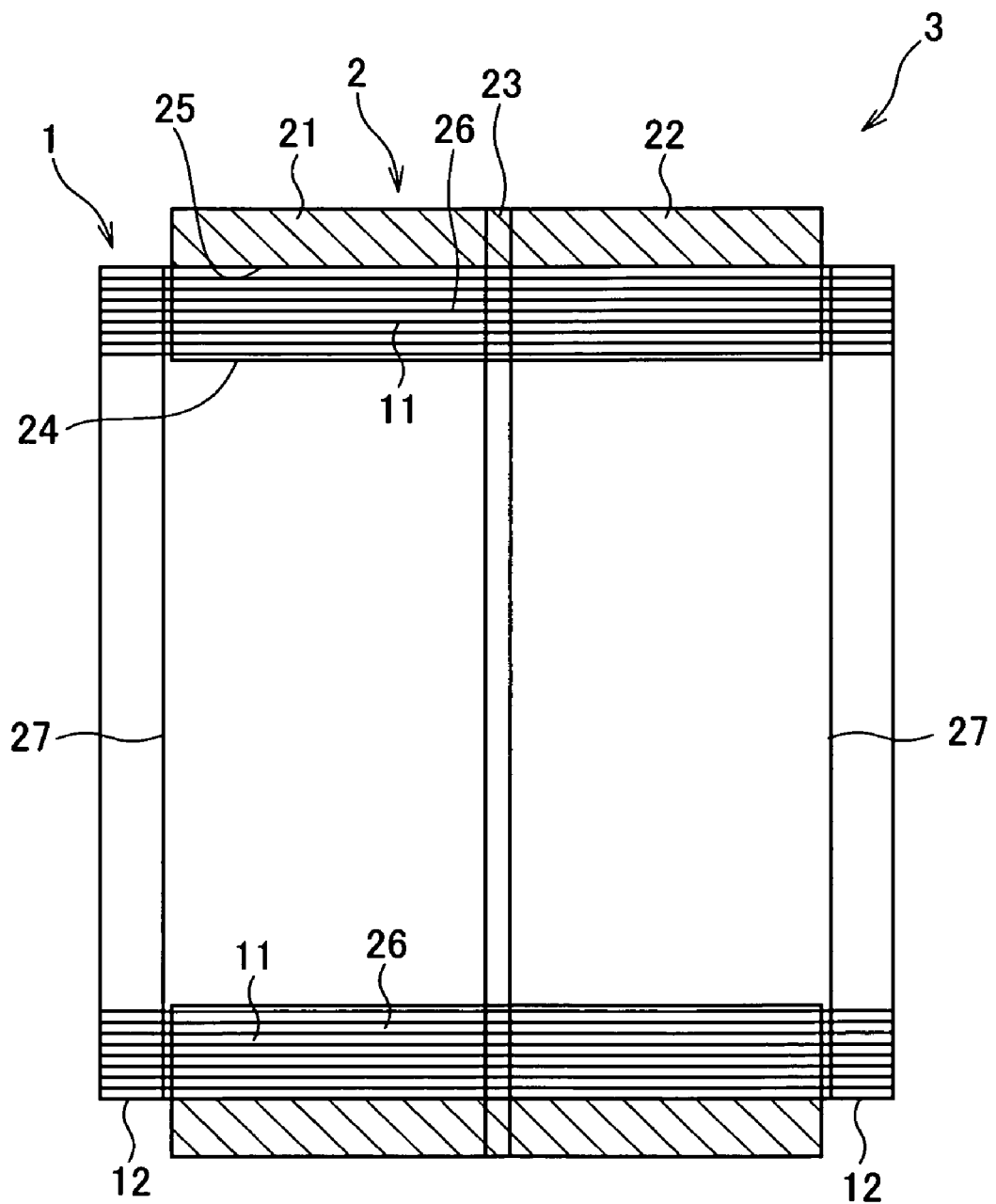
FIG. 3 is a schematic axial cross-sectional view of the stator core of the stator illustrated in FIG. 1.

Referring to FIG. 3, hereinafter is explained the stator core 2 made up of laminated electromagnetic steel plates. FIG. 3 is a schematic axial cross-sectional view of the stator 3. As can be seen, in the stator 3, the stator core 2 is in the state of being fitted with the stator coil 1.

The stator core consists of end portions 21, 22 of the core (hereinafter referred to as "end cores 21, 22") and a center portion 23 of the core (hereinafter referred to as "center core 23"). The end cores 21, 22 are arranged axially sandwiching the center core 23. Indicated by numeral 24 is a plane including tip end faces of the teeth of the end cores 21, 22 and the center core 23, which plane corresponds to the inner peripheral surface of the stator core 2. Indicated by numeral 25 is a plane including the bottom surfaces of slots 26 of the end cores 21, 22 and the center core 23.

The slot-accommodated portions 11 of the stator coil 1 are accommodated in the slots 26 of the end cores 21, 22 and the center core 23. Indicated by 27 are lines indicative of the end faces of insulator sheets accommodated in the respective slots 26. Each of the ends of each slot-accommodated portion 11 continues into each of the coil end portions 12 that form each of the coil ends. In FIG. 3, the axial length of each of the end cores 21, 22 is made considerably larger than that of the center core 23. However, as a matter of course, the proportion of the lengths can be adequately determined.

Figure 4:
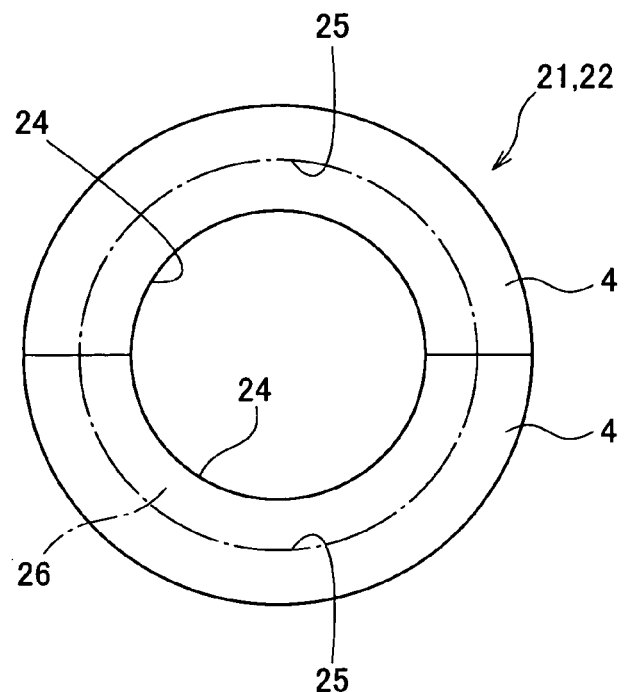
FIG. 4 is a plan view illustrating an end portion of the stator core illustrated in FIG. 3.

As schematically shown in FIG. 4, each of the end cores 21, 22 consists of two half-cylindrical segment cores 4, 4. In other words, the two half-cylindrical segment cores 4, 4 are combined with each other to impart a cylindrical shape to each of the end cores 21, 22.

Figure 5:
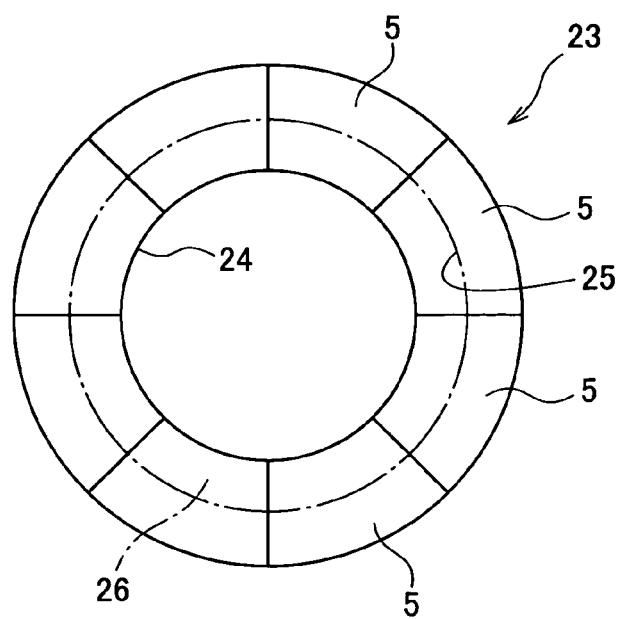
FIG. 5 is a plan view illustrating a center portion of the stator core illustrated in FIG. 3.

As schematically shown in FIG. 5, the center core 23 is made up of a combination of a total of "N" number of arc segment cores 5 obtained by dividing a cylindrical core into the "N" number of pieces in a rotational symmetrical manner. In other words, the "N" number of arc segment cores 5 are combined with each other to impart a cylindrical shape to the center core 23.

In FIG. 5, eight arc segment cores 5 are cylindrically combined to form the center core 23. However, the circumferential angle occupied by each of the arc cores 5 may be appropriately changed only if the occupying angle is less than 180°. Also, the shape of a radial cross section, in other words, segment edges, of each half-cylindrical segment core 4 may also be appropriately freely designed. However, for the convenience of the manufacturing processes, all the arc segment cores 5 may preferably have the same shape.

The structural feature of the stator 3 lies in that, of the end cores 21, 22 and the center core 23 adjacently disposed in the axial direction to form the stator core 2, the center core 23 is made up of a greater number of segment cores than in the end cores 21, 22. For example, when each of the end cores 21, 22 is configured by 120-degree arc segment cores obtained by evenly dividing a cylinder into three, the center core 23 may be configured by less-than-90-degree arc segment cores 4 obtained by evenly dividing a cylinder into four or more. Thus, in the stator core 2, the end portions of the core, i.e. the end cores 21, 22, have a less number of segments. As a result, the rigidity of the stator core 2 is increased, the iron loss is decreased, and the number of assembling processes can be reduced.

Hereinafter will be described a method for manufacturing the stator 3.

Figure 6:
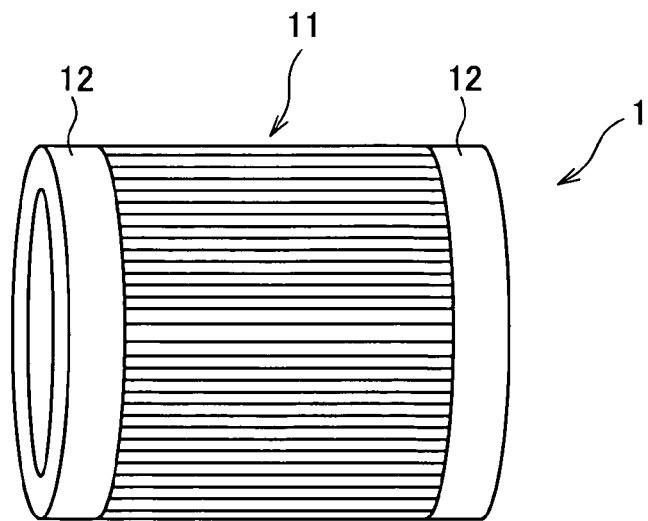
FIG. 6 is a schematic perspective view illustrating a stator coil used in a method for manufacturing a stator, according to a first embodiment of the present invention.

First, a step of forming the cage stator coil 1 mentioned above is carried out to configure the stator coil 1 shown in FIG. 6. The cross section of the coil conductor perpendicular to the longitudinal direction thereof, configuring the stator coil 1, has a rectangular shape. Specifically, the stator coil 1 is made up of a so-called flat wire having a large cross-sectional area. The step, per se, of forming the cage stator coil 1 using the flat wire does not constitute the gist of the present invention. Therefore, the explanation on the specific method of manufacture is omitted.

Then, at the subsequent step, the axial center portion of the stator coil 1 is radially compressed to reduce the diameter of the stator coil 1. This step of radial compression is more specifically described with reference to FIG. 7.

Figure 7:
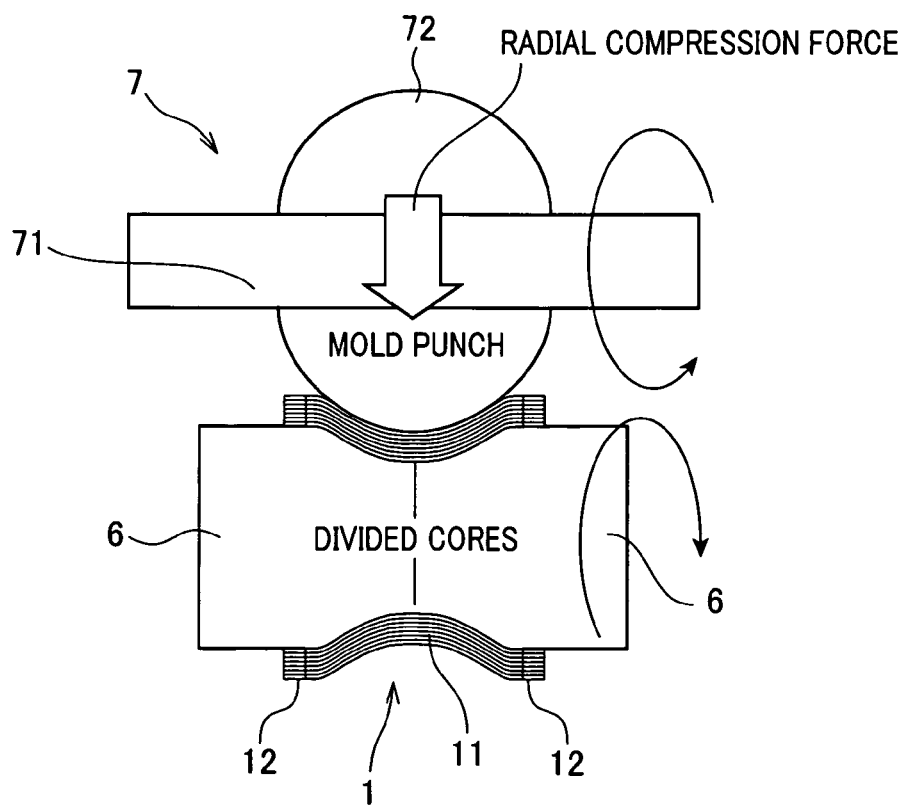
FIG. 7 is a schematic axial cross-sectional view illustrating a step of radially compressing the stator coil, according to the first embodiment.

First, a radial compression device is explained, referring to FIG. 7. The radial compression device includes a pair of divided cores 6, 6 and a mold punch 7. Each counterpart core 6 has a tapered cylindrical shape and has a base end portion whose diameter substantially coincides with the inner diameter of the stator coil 1. In particular, each counterpart core 6 has a top end portion whose diameter is slightly smaller than that of the base end portion, by a predetermined length. The divided cores 6, 6 are individually inserted into the stator coil 1 from the lateral sides of the coil for the mating of the top end portions of the divided cores 6, 6. As a result, the tapered divided cores 6, 6, as a whole, provide a cylindrical shape, with the diameter at the center portion being reduced.

The mold punch 7 plays a roll of plastically deforming the stator coil 1 for radial compression. The mold punch 7 includes a rotary shaft 71 and a thick disk-shaped puncher 72 which is fitted and secured to the rotary shaft 71. The axial cross section of the puncher 72 has a shape which is substantially equal to the axial cross section of the small-diameter portion of the divided cores 6, 6 with the addition of the radial thickness of the stator coil 1. The maximum-diameter portion of the puncher 72 and the minimum-diameter portion of the divided cores 6, 6 are located at the same axial position. The rotary shaft 71 is adapted to be displaceable in the direction of radial compression, shown in FIG. 7, of the stator coil. The mold punch 7 is also provided with a rotating device for rotating the rotary shaft 71 and an advancing/retreating device for advancing/retreating the rotary shaft 71 in the direction of radial compression of the stator coil 1 (see FIG. 7). However, since these devices are generally used ones, they are omitted from the illustration.

The procedure of the radial compression is explained below. First, the divided cores 6, 6 are individually inserted into the stator coil 1 from the respective axially lateral sides of the coil to have the top end faces of the divided cores 6, 6 been in closely contact with each other. Then, the mold punch 7 is rotated, and at the same time is moved toward the stator coil in the radial direction of the stator coil. Thus, the mold punch 7 radially compresses the stator coil 1 except for the lateral end portions of the stator coil 1.

In this way, the stator coil 1 is pressed against the outer peripheral surfaces of the divided cores 6, 6 by the mold punch 7 and plastically deformed into the shape of a Japanese hand drum "tsuzumi" as shown in FIG. 7. In other words, the amount of radial compression of the stator coil 1 is maximized at the axial center portion of the coil, and is continuously decreased toward its lateral end portions.

Figure 8:
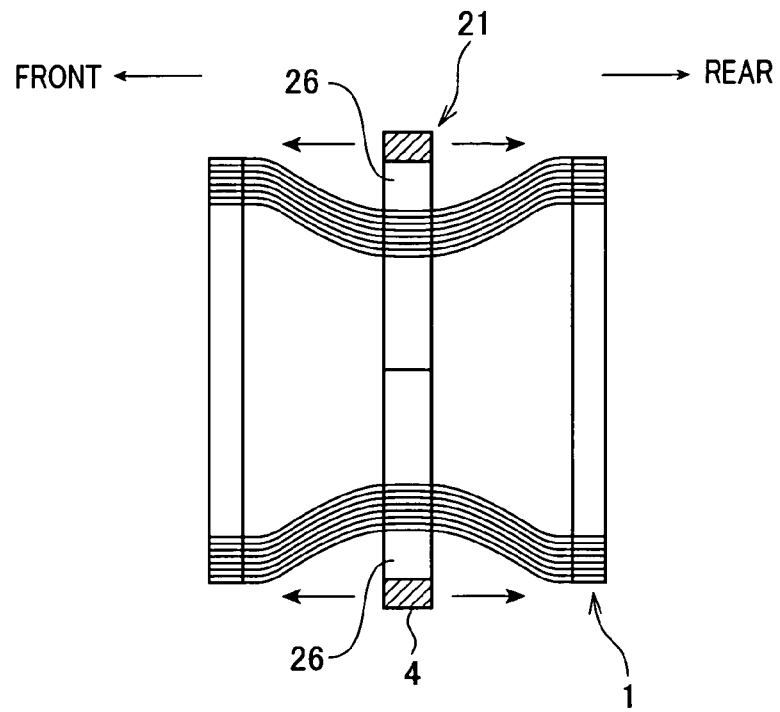
FIG. 8 is a schematic axial cross-sectional view illustrating an initial stage at a step of fitting a core with a cage coil, according to the first embodiment.

The tsuzumi-shaped stator coil 1 is then removed from the mold punch 7 and the divided cores 6, 6, followed by the fitting of the end cores 21, 22 and the center core 23. Referring to FIG. 8, the step of the fitting is explained. In the present embodiment, in addition to the end cores 21, 22 and the center core 23, the stator core 2 is provided with intermediate cores 21', 22' each made up of the half-cylindrical segment cores 4, 4, as in the end cores 21, 22. The cylindrical partial cores, i.e. the end cores 21, 22, the center core 23 and the intermediate cores 21', 22', are axially arranged, so that in the state of completion, these cylindrical partial cores are axially arranged in the order of 21, 21', 23, 22' and 22 (see FIG. 9).

First, the half-cylindrical segment cores 4, 4 for configuring the end core 21 are arranged at the axial center portion, i.e. the minimum-diameter portion, of the tsuzumi-shaped stator coil 1 so as to be coaxial with the stator coil 1 to thereby form the cylindrical end core 21. After that, the end core 21 is axially moved toward the front end (to the left side in FIG. 8) of the stator coil 1. In the course of the axial movement of the end core 21, the slot-accommodated portions 11 of the stator coil 1, whose end portions have not been radially compressed, are accommodated in the slots 26 of the half-cylindrical segment cores 4, 4 (see FIG. 9). Then, in the manner similar to the above fitting process of the end core 21, the end core 22 is fitted to the stator coil 1 so as to be located at the opposite end portion of the stator coil 1. Then, the intermediate cores 21', 22' are sequentially fitted in the similar manner.

Figure 9:
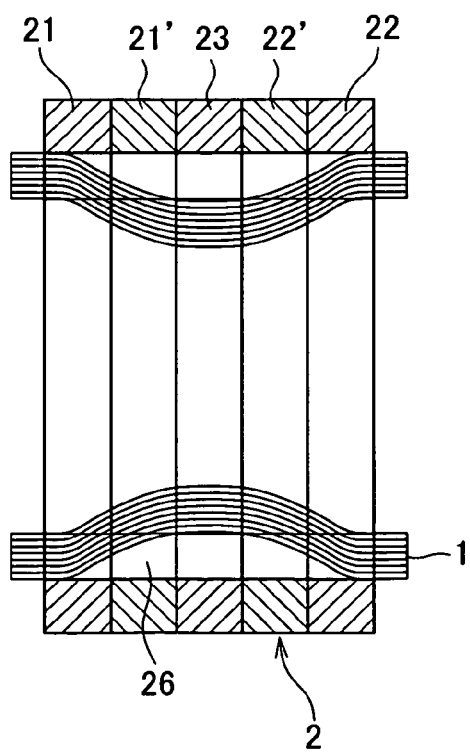
FIG. 9 is a schematic axial cross-sectional view illustrating a final stage at the step of fitting the core with the cage coil, according to the first embodiment.

As a result, except for the axial center portion, the end cores 21, 22 and the intermediate cores 21', 22' are fitted to the stator coil 1 and located radially outer side of the stator coil 1. As shown in FIG. 9, the slot-accommodated portions 11 of the stator coil 1 are almost fully accommodated in the slots 26 of the end cores 21, 22. However, as to the slots 26 of the intermediate cores 21', 22', due to the radial compression of the stator coil 1, the slot-accommodated portions 11 are only partially accommodated.

In this way, the space for the center core 23 (also referred to as "center space") is defined in the outer side of the axial center portion of the stator coil 1. Then, the eight arc segment cores 5 for configuring the center core 23 are arranged axially outer side of the center space. The eight arc segment cores 5 are moved radially inward for press-fitting into the center space. Thus, the stator core 2 consisting of the end cores 21, 22, the center core 23 and the intermediate cores 21', 22' is arranged axially outer side of the stator coil 1 (see FIG. 9).

Figure 10:
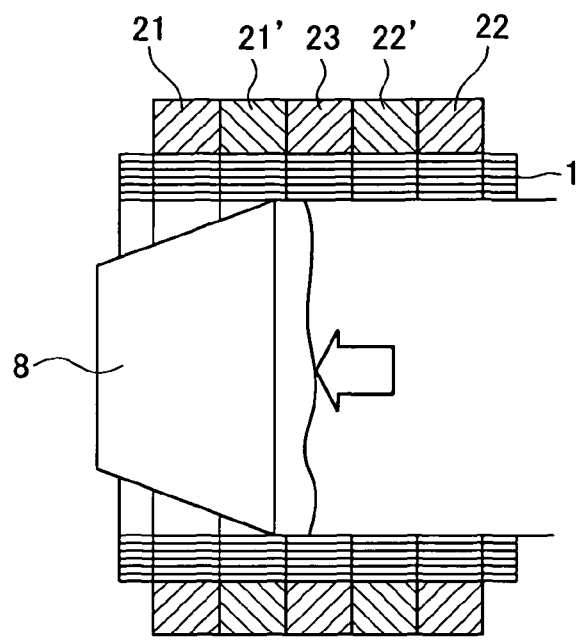
FIG. 10 is a schematic axial cross-sectional view illustrating a step of inserting slot-accommodated portions into slots, according to the first embodiment.

Then, after mutually bonding the segment cores of the stator core 2 by welding or the like, the subsequent step is carried out. At the subsequent step, the slot-accommodated portions 11 corresponding to the radially compressed portion of the stator coil 1 are biased radially outward. In the present embodiment, a push-in head 8 schematically shown in FIG. 10 is used for biasing the slot-accommodated portions 11 concerned.

The push-in head 8 is adapted to axially advance/retreat radially inner side of the slot-accommodated portions 11 of the stator coil 1, along the axial direction. The push-in head 8 has a frusto-conical shape, with the outer diameter of its top end portion being formed smaller than the minimum inner diameter of the tsuzumi-shaped stator coil 1, and the outer diameter of its base end portion being formed slightly smaller than the inner diameter of the stator core 2. With the axial movement of the push-in head 8, the slot-accommodated portions 11 concerned, corresponding to the radially compressed portion, of the stator coil 1 are substantially pushed into the slots 26. After that, the slot-accommodated portions 11 concerned are biased radially outward, whereby the entire slot-accommodated portions 11 are completely accommodated in the slots 26 to complete the stator 3.

According to the present embodiment, the half-cylindrical segment cores 4 for configuring the end cores 21, 22 and the intermediate cores 21', 22' are located outer side of the stator coil 1, i.e. at the axial center portion corresponding to the minimum diameter portion of the slot-accommodated portions 11 of the stator coil 1. Therefore, the size of each of the half-cylindrical segment cores 4, 4 may be increased so as to have a shape of a large-angle arc. In other words, the number of divisions of the end cores 21, 22 and the intermediate cores 21', 22' can be decreased. Thus, in the stator 3, iron loss may be decreased, torque may be increased, and rigidity may be enhanced.

Further, the radially outward biasing, as explained above, of the slot-accommodated portions 11 corresponding to the radially compressed portion of the stator coil 1 may contribute to increasing work hardening, and thus the rigidity of the slot-accommodated portions 11 concerned will be enhanced. Thus, the stator coil 1 can be prevented from projecting out of the opening portions of the slots into the inside of the stator core 2. Thus, no new step has to be added to thereby avoid complication of the manufacture.

(First Modification)

Preferably, the circumferential positions of the mutually bonded faces of the half-cylindrical segment cores 4, 4 for configuring each of the end cores 21, 22 may be circumferentially offset from the circumferential positions of the mutually bonded faces of the arc segment cores 5 for configuring the center core 23. Thus, magnetic resistance can be reduced.

(Second Modification)

In the above embodiment, the intermediate cores 21', 22' have been arranged between the end cores 21, 22 and the center core 23, and each of the intermediate cores 21', 22' has been configured by the half-cylindrical segment cores 4, 4, similar to the end cores 21, 22. In this case as well, it is preferable that the circumferential positions of the mutually bonded faces of the half-cylindrical segment cores 4, 4 for configuring each of the end cores 21, 22 may be circumferentially offset from the circumferential positions of the mutually bonded faces of the half-cylindrical segment cores 4, 4 for configuring each of the intermediate cores 21', 22'. Thus, magnetic resistance can be decreased.

(Third Modification)

In the above embodiment, the intermediate cores 21', 22' have been arranged between the end cores 21, 22 and the center core 23, and each of the intermediate cores 21', 22' have been configured by the half-cylindrical segment cores 4, 4, similar to the end cores 21, 22. Alternatively, the intermediate cores 21', 22' may have more number of divisions than the end cores 21, 22. However, in this case, the number of divisions of the intermediate cores 21', 22' may preferably be less than the number of divisions of the center core 23. In this case as well, it is preferable that the circumferential positions of the mutually bonded faces of the half-cylindrical segment cores 4, 4 for configuring each of the end cores 21, 22 may be circumferentially offset from the circumferential positions of the mutually bonded faces of the half-cylindrical segment cores 4, 4 for configuring each of the intermediate cores 21', 22'. Thus, magnetic resistance can be decreased.

(Second Embodiment)

Figure 11:
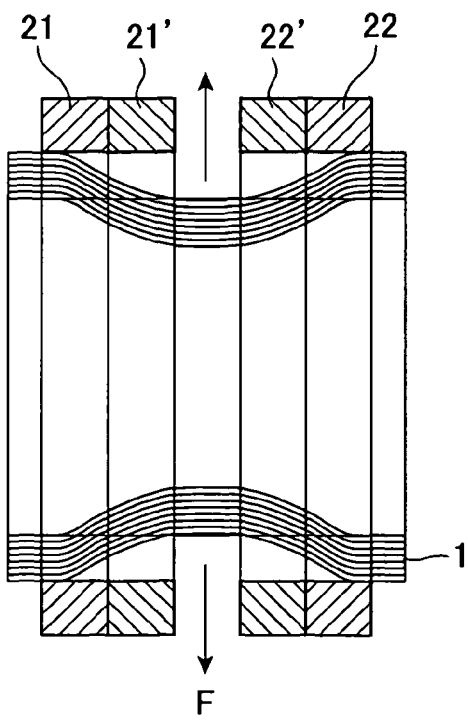
FIG. 11 is a schematic axial cross-sectional view illustrating an initial stage at a step of fitting a core with a cage coil and at a step of inserting slot-accommodated portions into slots, according to a second embodiment of the present invention.
Figure 12:
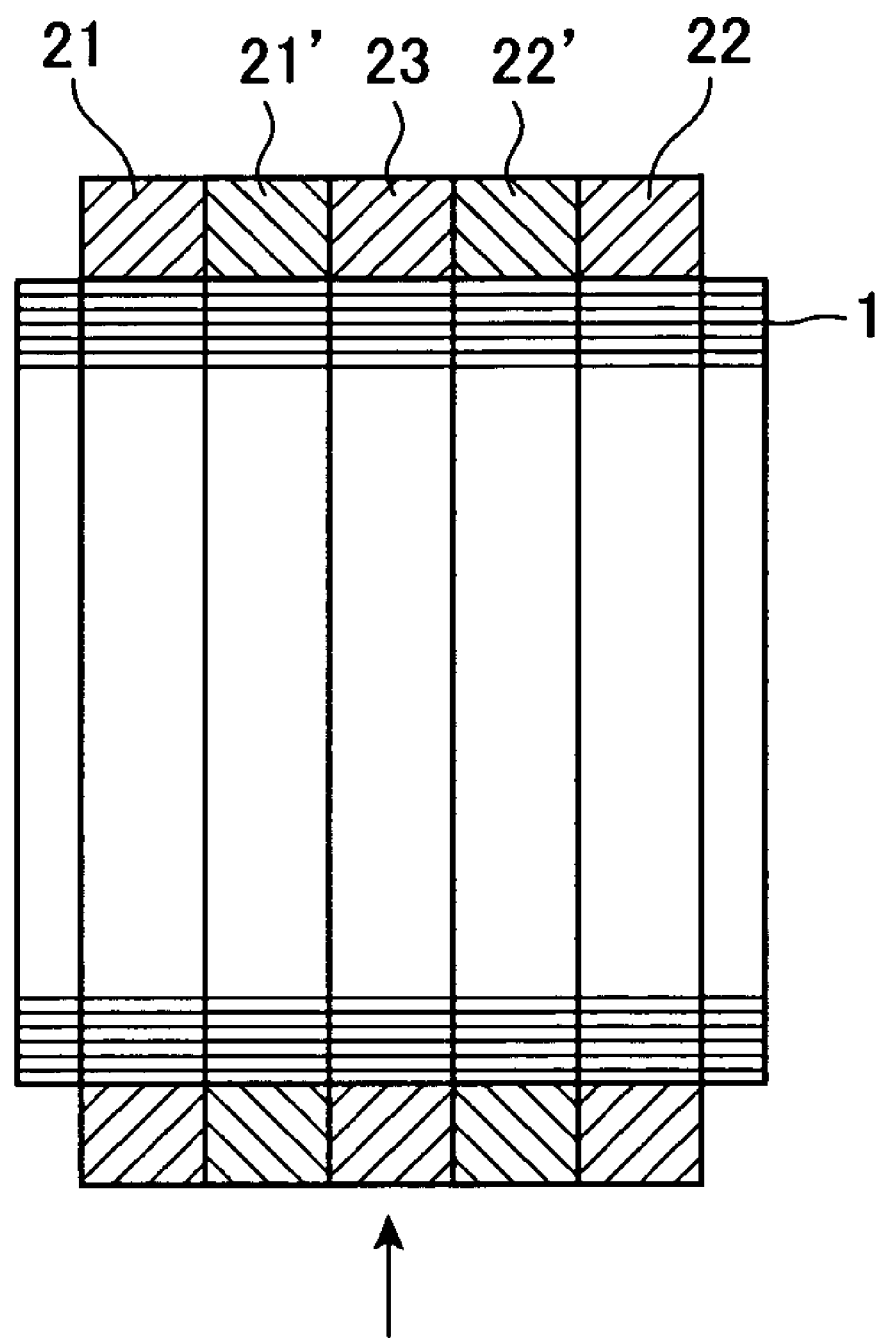
FIG. 12 is a schematic axial cross-sectional view illustrating a state where a step of inserting slot-accommodated portions into slots has been completed, according to the second embodiment.

Referring now to FIGS. 10 to 12, hereinafter is described a method for manufacturing the stator 3, according to a second embodiment. In the second embodiment, the identical or similar components to those in the first embodiment described above are given the same reference numerals for the sake of omitting explanation.

The second embodiment is different from the first embodiment in that the steps involved in fitting the core have been changed. The steps of forming and radially compressing the stator coil 1 are the same as those in the first embodiment.

With reference to FIG. 8, the steps of fitting the core according to the second embodiment are explained. In the present embodiment as well, the stator core 2 has the end cores 21, 22 and the center core 23, as well as the intermediate cores 21', 22' configured by the half-cylindrical segment cores 4, 4.

First, the end cores 21, 22 and the intermediate cores 21', 22' are fitted to the stator coil 1 so as to be located radially outer side of the stator coil 1, in the same manner as in the first embodiment. Specifically, the half-cylindrical segment cores 4, 4 are located at the axial center portion, i.e. the minimum-diameter portion, of the stator coil 1 so as to be coaxial with the stator coil 1. Then, the segment cores 4, 4 are axially moved to thereby configure the end cores 21, 22 and the intermediate cores 21', 22'.

Then, at the next step, the slot-accommodated portions 11 of the tsuzumi-shaped stator coil 1 are radially outwardly biased (see FIG. 11). This biasing is carried out using the push-in head 8, for example, used in the first embodiment. Thus, the slot-accommodated portions 11 are accommodated in the slots of the end cores 21, 22 and the intermediate cores 21', 22'.

Subsequently, eight arc segment cores 5 for configuring the center core 23 are arranged at the space for the center core 23 (center space) defined in the outer side of the axial center portion of the stator coil 1. The eight arc segment cores 5 are radially moved inward for press-fitting into the center space. At this occasion, the slot-accommodated portions 11 corresponding to the center core 23 are inserted into the slots of the arc segment cores 5 (see FIG. 12). Thus, the slot-accommodated portions 11 of the stator coil 1 are entirely accommodated in the slots of the stator core 2. After that, the segment cores of the stator core 2 are mutually bonded by welding or the like to thereby complete the stator 3. According to the present embodiment, the advantages similar to those in the first embodiment can be attained.

What is claimed is:

1. A method of manufacturing a stator for an inner-rotor type rotary electric machine, characterized in that the method comprises steps of:

preparing a cage stator coil that is a distributed-winding coil formed by circumferentially arranging a number of slot-accommodated conductor portions to be accommodated in respective slots of a stator at a predetermined pitch and at a position radially distanced from an axis of the stator by a predetermined length, and a cylindrical stator core configured by a plurality of segment cores;

forming a concave-drum stator coil by reducing a diameter of the cage stator coil at an axial center portion thereof so as to be shorter than a diameter at each axial end portion of the cage stator coil;

setting end segment cores at an axial center portion of the concave-drum stator coil, the end segment cores configuring cylindrical end cores that form respective axial end portions of the stator core, followed by displacing the end segment cores in an axial direction so as to be set at the axial end portions of the stator core; and setting center segment cores at the axial center portion of the concave-drum stator coil, the center segment cores configuring a cylindrical center core that forms the axial center portion of the stator core.

2. The method of manufacturing a stator for an inner-rotor type rotary electric machine according to claim 1, wherein the method comprises a step of urging reduced-diameter portions of the stator coil in a radially outward direction after the step of setting the center segment cores to accommodate the reduced-diameter portions in the respective slots.

3. The method of manufacturing a stator for an inner-rotor type rotary electric machine according to claim 1, wherein the method comprises a step of urging the reduced-diameter portions of the stator coil in a radially outward direction before the step of setting the center segment cores to accommodate the reduced-diameter portions in the respective slots of the stator core.

4. The method of manufacturing a stator for an inner-rotor type rotary electric machine according to claim 1, wherein the center core is configured by the center segment cores the number of which is larger than that of the end segment cores configuring the end cores.

5. The method of manufacturing a stator for an inner-rotor type rotary electric machine according to claim 1, wherein the end segment cores configuring the end cores have a circumferential occupying angle larger than that of the center segment cores configuring the center core.

* * * * *